May 27, 1930.　　　E. W. SEEGER　　　1,760,088
GENERATOR CONTROL
Filed Aug. 25, 1928
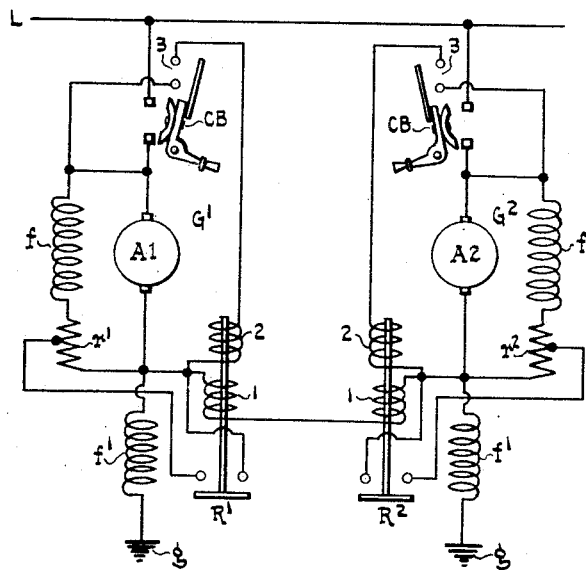
INVENTOR
Edwin W. Seeger.
BY
ATTORNEY Patented May 27, 1930

1,760,088

UNITED STATES PATENT OFFICE

EDWIN W. SEEGER, OF WAUWATOSA, WISCONSIN, ASSIGNOR, BY MESNE ASSIGNMENTS, TO CUTLER-HAMMER, INC., OF MILWAUKEE, WISCONSIN, A CORPORATION OF DELAWARE

GENERATOR CONTROL

Application filed August 25, 1928. Serial No. 301,950.

This invention relates to generator control.

More particularly the invention relates to controllers for direct current generators operating in parallel.

The invention has among its objects to provide simple and efficient means whereby the desired operation of the parallel connected generators may be obtained even though one machine is hot and the other cold, or the machines are set for slightly different voltages.

Other objects and advantages of the invention will hereinafter appear.

The accompanying drawing illustrates diagrammatically one embodiment of the invention which will now be described, it being understood that the embodiment illustrated may be modified in various respects without departing from the scope of the appended claims.

Referring to the drawing, the same shows two compound direct current generators $G^1$ and $G^2$, each comprising a shunt field $f$ and a series field $f^1$ having a ground connection $g$. Each generator is provided with a suitable single pole circuit breaker CB to connect the same to a line L.

The control means illustrated comprises normally open relays $R^1$ and $R^2$, the former to control a resistance $r^1$ in series with the shunt field of generator $G^1$, and the latter to control a resistance $r^2$ in series with the shunt field of generator $G^2$. As will be apparent, each relay when closed completes a short circuit around its respective resistance, thereby effecting an increase in the field strength of one of the generators and consequent increase in voltage of such generator.

Each relay has a series winding 1 and a shunt winding 2 and is dependent upon cumulative action of such coils for response to engage its contacts. The series coils 1 are included in series in an equalizing connection between the generators, this connection preferably being made from a point between the armature and series field of generator $G^1$ to a similar point in the connections of generator $G^2$. On the other hand, the shunt coils 2 are respectively connected across the armatures of generators $G^1$ and $G^2$ and preferably through auxiliary contacts 3 of the circuit breakers of their respective generators whereby each shunt coil will be open circuited upon disconnection of its generator.

The series coils of the relays being connected as described, are subjected to a flow of current in one direction if the voltage of generator $G^1$ is higher than that of generator $G^2$ and to a reverse flow of current if the voltage of generator $G^2$ is higher than that of generator $G^1$. Accordingly assuming the shunt windings to be of the same polarity and the series coils to be oppositely wound as indicated, current flow through the latter in a given direction will cause one to act cumulatively with its respective shunt winding and the other to oppose its respective shunt winding, whereas a reverse current flow will effect cumulative action of the formerly opposing windings and opposing action of the formerly cumulative windings. Thus provision is made for response of the relays selectively according to the direction of flow of current through their series windings, and more particularly for response of relay $R^2$ when the voltage of generator $G^1$ exceeds that of generator $G^2$ and for response of relay $R^1$ when the voltage of generator $G^2$ exceeds that of generator $G^1$.

It will thus be observed that whenever the voltage of either generator exceeds that of the other one of the relays will tend to respond to short circuit the resistance in the shunt field circuit of the latter generator to effect an increase in the voltage of such generator. As will be understood, the relays may be designed and adjusted to respond at appropriate current values and for vibratory action thereof if desired.

While the controller selected for illustration employs only a single step of resistance for each generator, it will be obvious that the resistance for each generator might be divided into a number of steps controllable by different calibrated relays such as those illustrated or by a suitable rheostat under the control of the relays illustrated. Also, it will be obvious that if desired the field regulation might be limited to one generator, such field regulation being effected by means sensitive to variations in voltage of the other generator.

What I claim as new and desire to secure by Letters Patent is:

1. The combination with compound direct current generators connected in parallel and having an equalizer connection, of shunt field regulating means for one of said generators including a control winding and connections whereby the energizing current of said winding is rendered proportional to the potential drop in said equalizer connection.

2. The combination with compound direct current generators connected in parallel and having an equalizer connection, of shunt field regulating means for said generators including means subjected to influence by the current flow in said equalizer connection for effecting regulation of said generators selectively.

3. In combination, compound direct current generators connected in parallel and having an equalizer connection, resistance for the shunt field circuit of one of said generators and electroresponsive means to include and exclude said resistance, said means having connections whereby the current supplied to a winding thereof is rendered proportional to the difference in terminal voltage of the generators.

4. In combination, compound direct current generators connected in parallel and having an equalizer connection, resistance for the shunt field circuit of each of said generators and electroresponsive means subjected to the current flow through said equalizer connection to regulate the shunt field strength of the generators selectively through the medium of said resistance.

5. The combination with compound direct current generators connected in parallel and having an equalizer connection, of shunt field regulating means for one of said generators, said means comprising an electroresponsive device having coacting control windings, one being included in said equalizer connection.

6. The combination with compound direct current generators connected in parallel and having an equalizer connection, of means to regulate the shunt field strength of said generators selectively, said means comprising relays each having a winding included in said equalizer connection and a coacting winding whereby said relays are rendered responsive selectively according to the direction of current flow through said equalizer connection.

7. The combination with compound direct current generators connected in parallel and having an equalizer connection, of separate means for regulating the shunt field strength of said generators selectively, each regulating means comprising a relay having a winding connected across the armature of its respective generator and a coacting winding included in said equalizer connection.

8. The combination with compound direct current generators connected in parallel and provided with an equalizer connection, of a relay having a control winding connected across the armature of one of said generators and a coacting winding included in said equalizer connection, a second relay having a control winding connected across the armature of another of said generators and a coacting winding included in said equalizer connection, said relays being responsive selectively according to the direction of current flow through said equalizer connection and means controlled by said relays to effect shunt field regulation of said generators selectively.

9. The combination with compound direct current generators connected in parallel, each of said generators having a connection to ground, separate single pole switches controlling the continuity of the circuits of said generators, an equalizer connection between said generators and field regulating means for said generators including windings subjected to the currents traversing said equalizer connection and coacting windings connected across the armatures of said generators respectively subject to control by said switches for disconnection from their respective generators upon disconnection of the latter.

In witness whereof, I have hereunto subscribed my name.

EDWIN W. SEEGER.